US010795567B2

(12) United States Patent
Vegesna et al.

(10) Patent No.: US 10,795,567 B2
(45) Date of Patent: Oct. 6, 2020

(54) MULTIMEDIA APPLICATIONS AND USER INTERFACES

(71) Applicant: Zoho Corporation Private Limited, Pleasanton, CA (US)

(72) Inventors: Ramakrishna Raju Vegesna, San Jose, CA (US); Mohideen Sheik Sulaiman, Chennai (IN); Manimaran Arumugam, Chennai (IN); Sathyanarayanan Purushothaman, Chennai (IN); Ashok Ramamoorthy, Chennai (IN)

(73) Assignee: Zoho Corporation Private Limited, Kancheepuram District (IN)

( * ) Notice: Subject to any disclaimer, the term of this patent is extended or adjusted under 35 U.S.C. 154(b) by 566 days.

(21) Appl. No.: 14/829,279

(22) Filed: Aug. 18, 2015

(65) Prior Publication Data
US 2016/0054908 A1 Feb. 25, 2016

Related U.S. Application Data

(60) Provisional application No. 62/040,829, filed on Aug. 22, 2014, provisional application No. 62/079,521, filed on Nov. 13, 2014.

(51) Int. Cl.
*G06F 3/0488* (2013.01)
*G06F 3/0482* (2013.01)
(Continued)

(52) U.S. Cl.
CPC .......... *G06F 3/0488* (2013.01); *G06F 3/0482* (2013.01); *G06F 3/0486* (2013.01);
(Continued)

(58) Field of Classification Search
CPC ....... G06F 2203/04808; G06F 3/04883; G06F 3/017; G06F 3/04817; G06F 2203/04803; G06F 3/0482; G06F 3/04842
See application file for complete search history.

(56) References Cited

U.S. PATENT DOCUMENTS

| 7,479,949 B2 | 1/2009 | Jobs et al. |
| 8,232,990 B2 | 7/2012 | King et al. |

(Continued)

FOREIGN PATENT DOCUMENTS

WO 2012125815 A2 9/2012

OTHER PUBLICATIONS

Wroblewski, Touch Gesture Reference Guide, Apr. 19, 2010, web page printout.
(Continued)

*Primary Examiner* — Justin S Lee
(74) *Attorney, Agent, or Firm* — Silicon Edge Law Group LLP; Thomas W. Lathram; Arthur J. Behiel

(57) ABSTRACT

A computer-implemented method for use in conjunction with a computing device with a touch-screen display allows users to organize and sort multimedia notecards and notebooks in an intuitive manner. Graphical control elements for associated multimedia programs are depicted on the display using text and images indicative of their content. These text and images are compressed to preserve their visibility when the user accesses program-specific settings and interactions. Notecards can be displayed and organized differently based on e.g. display orientation, and different types of display inputs can sort and combine the notecards using intuitive visual responses to the inputs.

13 Claims, 9 Drawing Sheets

(51) Int. Cl.
*G06F 3/0484* (2013.01)
*G06F 3/0481* (2013.01)
*G06F 3/0486* (2013.01)

(52) U.S. Cl.
CPC ...... *G06F 3/04817* (2013.01); *G06F 3/04842* (2013.01); *G06F 3/04883* (2013.01)

(56) References Cited

U.S. PATENT DOCUMENTS

| | | | |
|---|---|---|---|
| 8,407,606 B1* | 3/2013 | Davidson | G06F 3/0488 345/173 |
| 8,514,221 B2 | 8/2013 | King et al. | |
| 8,645,872 B2 | 2/2014 | Maxfield et al. | |
| 8,766,928 B2 | 7/2014 | Weeldreyer et al. | |
| 8,839,150 B2* | 9/2014 | King | G06F 3/017 715/836 |
| 8,856,678 B1* | 10/2014 | Cho | G06F 3/0488 345/682 |
| 2006/0026535 A1 | 2/2006 | Hotelling et al. | |
| 2007/0266093 A1* | 11/2007 | Forstall | G06F 9/4443 709/204 |
| 2008/0282190 A1* | 11/2008 | Kagaya | G06F 16/48 715/794 |
| 2010/0045619 A1* | 2/2010 | Birnbaum | G06F 1/1613 345/173 |
| 2010/0083111 A1* | 4/2010 | de los Reyes | G06F 3/0482 715/702 |
| 2010/0085318 A1* | 4/2010 | Lee | G06F 3/04883 345/173 |
| 2010/0088639 A1* | 4/2010 | Yach | G06F 1/1626 715/825 |
| 2010/0090971 A1* | 4/2010 | Choi | G06F 3/04883 345/173 |
| 2010/0131835 A1 | 5/2010 | Kumar et al. | |
| 2010/0138763 A1* | 6/2010 | Kim | G06F 1/1626 715/765 |
| 2010/0161540 A1 | 6/2010 | Anisimov et al. | |
| 2011/0022958 A1* | 1/2011 | Kang | G06F 9/4443 715/716 |
| 2011/0264705 A1 | 10/2011 | Diamond | |
| 2012/0026100 A1* | 2/2012 | Migos | G06F 3/04883 345/173 |
| 2012/0030628 A1* | 2/2012 | Lee | G06F 3/0486 715/835 |
| 2012/0089950 A1 | 4/2012 | Tseng | |
| 2012/0131516 A1* | 5/2012 | Chiu | G06F 3/04883 715/863 |
| 2012/0266159 A1 | 10/2012 | Risbood et al. | |
| 2013/0069860 A1* | 3/2013 | Davidson | G06F 3/0416 345/156 |
| 2013/0145321 A1* | 6/2013 | Horiuchi | G06F 3/0483 715/830 |
| 2013/0187866 A1* | 7/2013 | Kim | G06F 3/0481 345/173 |
| 2013/0201194 A1* | 8/2013 | Ko | G06T 13/00 345/473 |
| 2013/0203468 A1* | 8/2013 | Weng | H04M 1/274533 455/564 |
| 2013/0222296 A1* | 8/2013 | Paek | G06F 3/01 345/173 |
| 2013/0227420 A1 | 8/2013 | Pasquero et al. | |
| 2013/0244784 A1* | 9/2013 | Assa | G06F 3/0488 463/40 |
| 2013/0328804 A1* | 12/2013 | Oshima | G06F 3/04842 345/173 |
| 2014/0035946 A1* | 2/2014 | Chang | G06F 3/017 345/619 |
| 2014/0115530 A1* | 4/2014 | Wang | G06F 3/0488 715/788 |
| 2014/0146330 A1* | 5/2014 | Miyata | G06F 3/1205 358/1.9 |
| 2014/0149901 A1* | 5/2014 | Hunter | H04L 12/282 715/765 |
| 2014/0173530 A1* | 6/2014 | Mesguich Havilio | G06F 3/04883 715/863 |
| 2014/0196022 A1 | 6/2014 | Skutin et al. | |
| 2014/0218761 A1* | 8/2014 | Chiba | H04N 1/00456 358/1.15 |
| 2014/0306965 A1* | 10/2014 | Yen | G06T 13/00 345/473 |
| 2015/0074721 A1* | 3/2015 | Fishman | H04N 21/4314 725/45 |
| 2015/0242076 A1* | 8/2015 | Jo | G06F 3/0483 715/765 |

OTHER PUBLICATIONS

ClickDesk, Live Chat, Video & VOIP, Helpdesk in one system, Aug. 6, 2014, web page printout.
Olark, Everything You Need to Make Customers Happy, Aug. 6, 2014, web page printout.
Olark, Targeted Chat, Aug. 6, 2014, web page printout.
Various contributors, Real user monitoring, (Wikipedia, Creative Commons), Sep. 9, 2014.
Google Support, Urchin Tracking Module (UTM), Sep. 17, 2015, web page printout.
AppsBuilder SpA, The All-in-One Tool, Nov. 15, 2015, web page printout.
SmartBear Software, Inc., AlertSite UXM What is Real-User Monitoring?, Sep. 9, 2014, web page printout.
Live Chat, For Customers—Chat Always available for your clients, Aug. 6, 2014, web page printout.
Zopim, Zopim Live Chat Features—Build Meaningful relationships, right on your website, Aug. 6, 2014, web site printout.
Guay, Matthew, Editorially—A Brilliant Markdown Collaborate Writing and Editing App, Jul. 19, 2013, web page printout.
Cholling, Charles C. et al., Natural language programming, (Wikipedia, Creative Commons), Nov. 24, 2014.
Viticci, Federico, Our Favorite Markdown Writing App for the iPhone, The Sweet Setup (Blanc Media, LLC), Feb. 4, 2015, web page printout.

* cited by examiner

MULTIMEDIA APPLICATIONS AND USER INTERFACES

FIELD OF THE INVENTION

The disclosed embodiments relate generally to electronic devices with touch-sensitive surfaces, and more particularly to electronic devices that use touch-sensitive surfaces to manipulate graphical control elements.

BACKGROUND

The cost of touch-screen displays has fallen, accompanied by a concomitant increase in market penetration. Users enjoy the ability to manipulate displayed objects without resort to a pointing device (e.g. mouse or touch-pad) or keyboard. Exemplary manipulations include adjusting the position, rotation, size, aspect ratio, and/or shape of one or more user-interface objects. However, existing methods for performing these manipulations can be cumbersome and non-intuitive. There is a need for efficient, intuitive, and visually appealing methods of interacting with touch-screen displays.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1A:
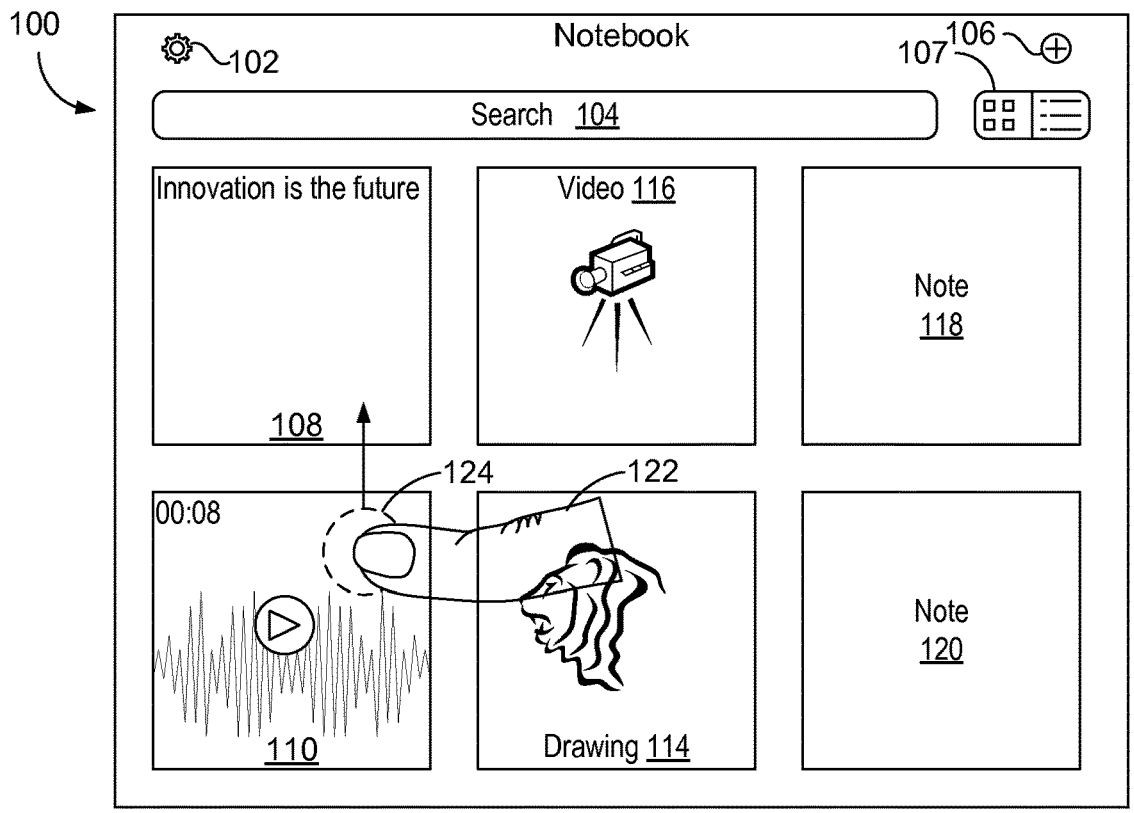
FIGS. 1A-1D illustrate an exemplary user interface 100 that appears on a surface of a touch-screen display device held in a landscape mode.

FIGS. 1A-1D illustrate an exemplary user interface 100 that appears on a surface of a touch-screen display device held in a landscape mode. An exemplary device is detailed, for example, in FIG. 24 and the related text of U.S. Pat. No. 8,232,990, which is incorporated herein by reference.

Interface 100 supports a "Notebooks" application that enables creation and management of Notebooks. Each Notebook can contain one or more notecards. A notecard is the basic element of a Notebook and may hold/contain objects created using content from any media (e.g. text, image, audio, and video). Selecting a notecard icon in any interface opens a notecard interface. Various ways of creating notecards are introduced and described below.

Interface 100 includes a number of graphical control elements that present touch-responsive links to underlying executable programs. These control elements include a settings icon 102, a search field 104, an add icon 106, and a mode-select icon 107. This being an interface for a notebook in a notebook application, the control elements also include a two-dimensional array of graphical control elements that represent various types of notecards. In this context a "card" includes an iconic representation of a multimedia file, and is a graphical control element with a visual area depicting a graphical user interface (GUI) of a command, e.g., an associated executable program. The cards in this example include a first graphical control element 108 that includes a first visual area depicting notecard text, "Innovation is the future." A user interacts with (e.g., taps) control element 108 to open a text interface that receives and displays textual input. Text for a notecard title or content may be entered via, e.g., a keyboard or voice-to-text application. The cards additionally include a second graphical control element 110 that includes a second visual area encompassing a signal 112 representative of an audio file and an associated play button. An associated program could e.g. play and record sound. A third graphical control element 114 with a third visual area depicts a drawing of a lion, which could represent drawings generally or be all or a portion of a drawing prepared by the user. A fourth graphical control element 116 with a fourth visual area depicts an icon representative of a movie camera to identify the corresponding media file as a video. A pair of additional control elements 118 and 120 can be links to one or more executable programs for notecards that have or include other media types or formats.

Settings icon 102 allows the user to customize interface 100 by adjusting e.g. the shape, size, and colors of the various notecard icons. A notecard icon may be configured, e.g., as a solid color, or with an image. Search field 104 accepts text input to locate notecards by name, contents, and notecard type. Add icon 106 allows the user to add a new notecard, prompting the user to select one of several notecard types (e.g., text, audio, video, photo, sketch, time entry, accounting, contact, map, photo album, checklist, and spreadsheet) A corresponding template type is selected in accordance with one embodiment. Some embodiments present these options as separate add icons in lieu of one add icon 106. For example, a separate add icon depicting a scanner enables scanning an image including text, e.g., a text-only document or one including graphical elements, e.g., a business card, and passing it through an optical character recognition (OCR) utility. An image thus scanned may serve as a notecard icon including embedded or metadata-stored text—useful e.g., for capturing business cards. A web-research interface including a web browser section and a scrollable notecard section is provided in response to activating a web icon in the notecard interface in accordance with one embodiment. Various notecards are displayed in the notecard section. Web content may be selected in the browser and added to a new or existing notecard—useful, e.g., for creating notes during internet research. Mode-select icon 107 allows the user to select either the landscape layout depicted in FIG. 1A or the portrait layout introduced below in connection with FIG. 2A. Mode selection can be automated where, for example, the display device includes orientation sensors to automatically detect the orientation of the interface.

Figure 1B:
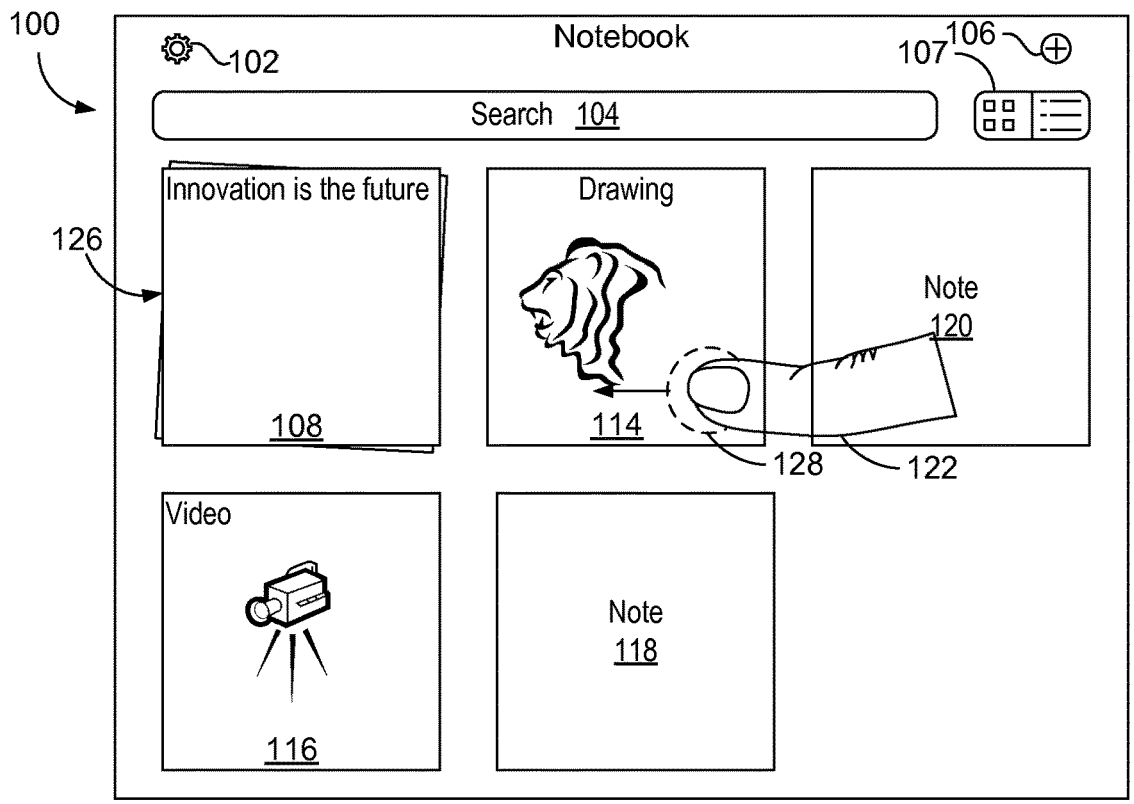

FIG. 1A also depicts a user's finger 122 at a contact point 124 within the visual area of the second graphical control element 110. An arrow indicates that finger swipes from contact point 124 extends along a contact line into the visual area of the first graphical control element 108. A user tap or touch may also be provided in accordance with another embodiment. Turning to FIG. 1B, the display device detects this user input and responds by combining the first and second graphical control elements into a single control element 126.

Control element 126 retains the view of first graphical control element 108 in this example, depicting a slightly misaligned underlying notecard to indicate the presence of the underlying, combined content. In this example, control element 126 links to one or more executable programs for displaying and manipulating text and recording and playing audio files. Other notecards and notecard types can be similarly combined. The remaining notecards move, in this example, to occupy the space formerly held by control element 110.

Finger 122 appears again in FIG. 1B establishing a contact point 128 to the visual area of graphical control element 114. Control element 114 provides a link to an executable drawing program. More generally, control element provides a link the notecard. A swipe, confined within the visual area of element 114 along the direction of the arrow, provides access to command icons for the drawing program (more generally, to the notecard) in the manner of FIG. 1C. Command icons may enable general operations for a notecard, e.g., get info, share, delete, and notecard type-specific operations, e.g., drawing and video applications. More generally, the method interprets any swipe along a contact line that is oblique relative to a respective strictly horizontal or vertical axis relative to a visual area of an element as if it were a strictly horizontal or vertical swipe. For example, a swipe along a contact line extending at least partially through a visual area of an element, e.g., 114, but oblique to a strictly horizontal axis relative to the element, may result in, e.g., compressing the visual area of the element in a dimension parallel to the horizontal axis even though the contact line is oblique relative to the horizontal axis.

Figure 1C:
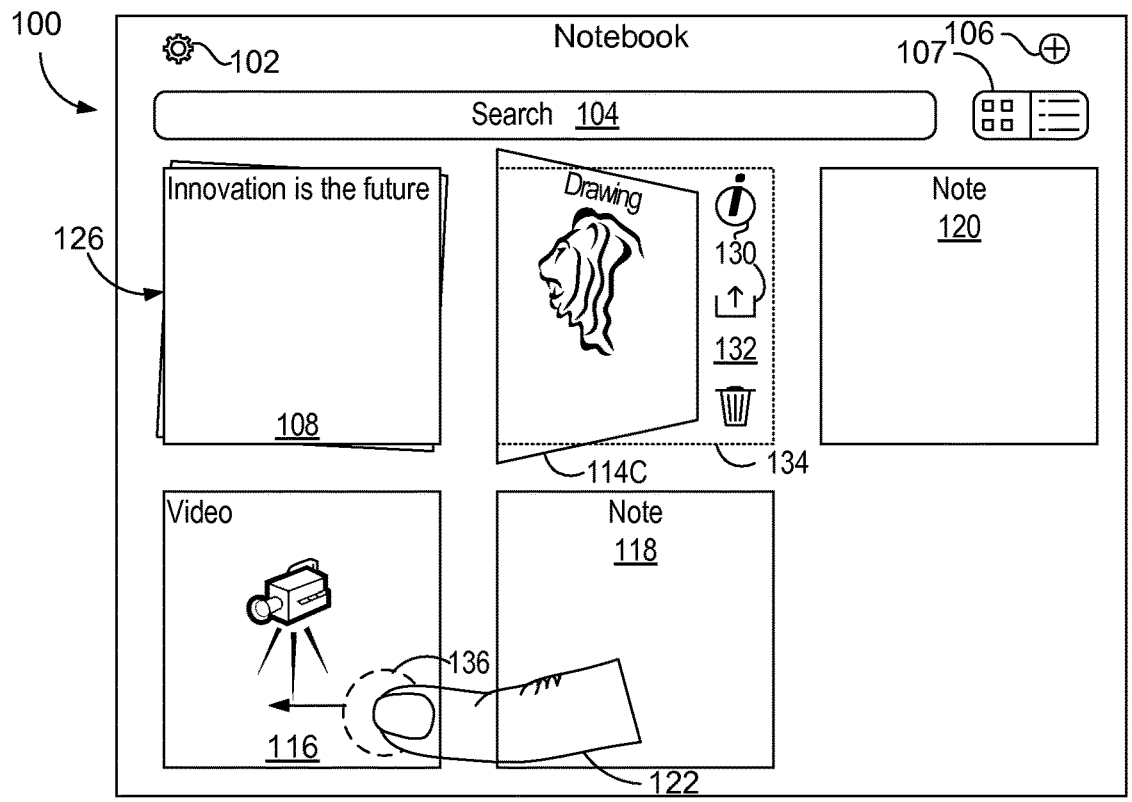

As shown in FIG. 1C, the swipe from contact point 128 causes the display device to compress the visual area of control element 114 in the dimension parallel to the line of contact. More generally, a visual area, e.g., the visual area of control element 114, is compressed in a dimension parallel to its own horizontal axis, e.g., as depicted in FIG. 1C. The display then presents command icons 130 (respectively from top to bottom, information, sharing, deleting) for the executable program in a region 132 that includes a subtraction of the compressed visual area 114C of control element 114 from the original visual area 134. Compressing the view of the graphical control element allows the user to interact with the executable program without obscuring the notecard contents. The drawing and visible text in element 114 are distorted but nevertheless visible in area 114C. In this example, the compressed view is a quadrilateral shape with only one pair of parallel sides, a shape that provides a sense that the user swipe rotated the notecard on an axis perpendicular to the direction of the swipe. The compressed area can take other shapes in other embodiments. Compressed area 114C can be restored to its original shape e.g. by swiping compressed area 114C to the right.

Figure 1D:
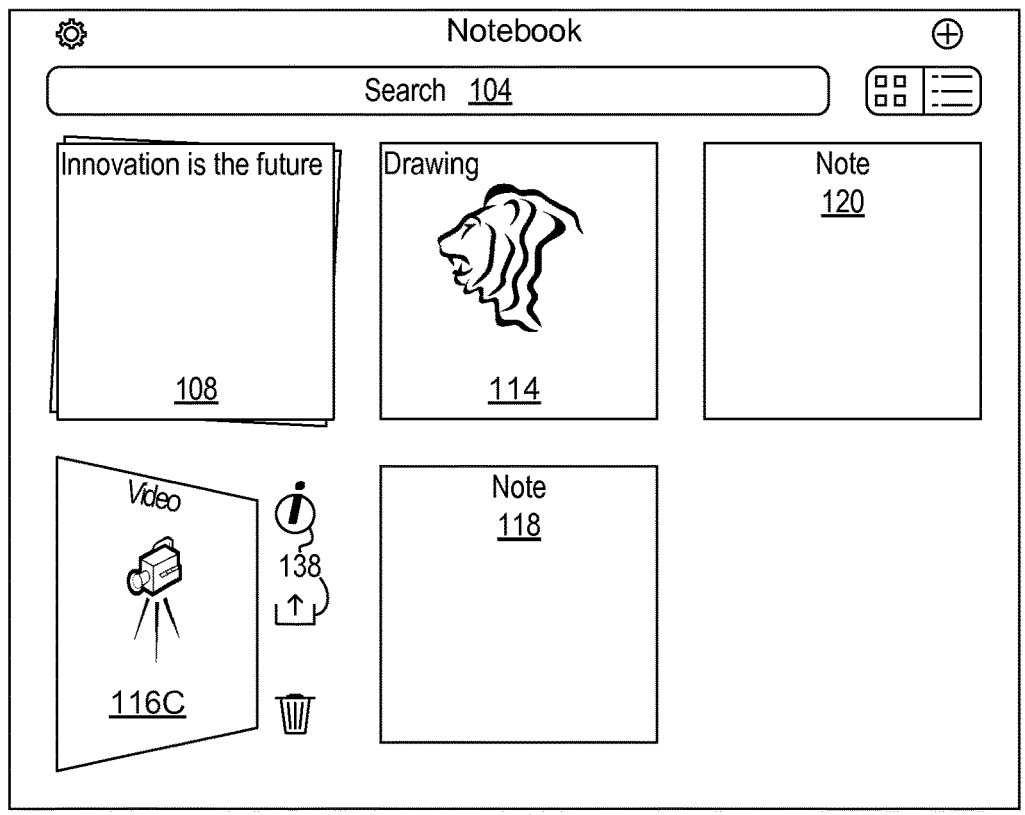

Finger 122 appears again in FIG. 1C establishing a contact point 136 to the visual area of graphical control element 116. Control element 116 provides a link to an executable video program. As with the example of FIG. 1C, a swipe, confined within the visual area of element 116 along the direction of the arrow, provides access to command icons for the drawing program. With reference to FIG. 1D, the swipe from contact point 136 causes the display device to compress visual area 116 in the dimension parallel to the line of contact, forming compressed visual area 116C. This compression both exposes the "underlying" settings icons 138 and restores visual area 114 to its original shape. This dual functionality saves the user the extra step of closing the setting menu for the drawing program.

Figure 2A:
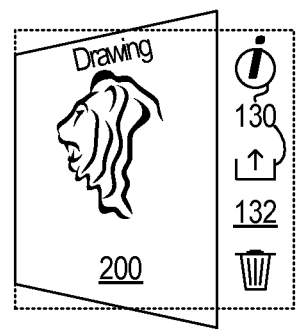
FIGS. 2A-2F illustrate views of graphical control elements in accordance with various embodiments.
Figure 2B:
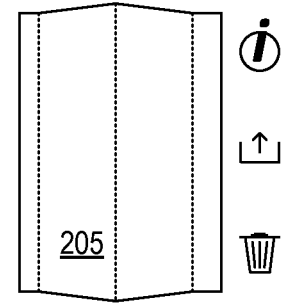
Figure 2C:
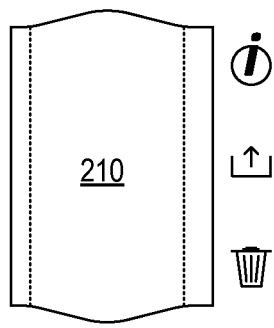
Figure 2D:
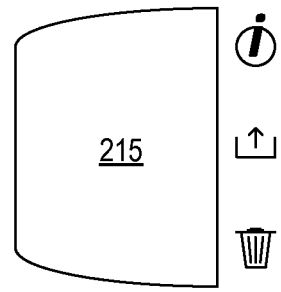
Figure 2E:
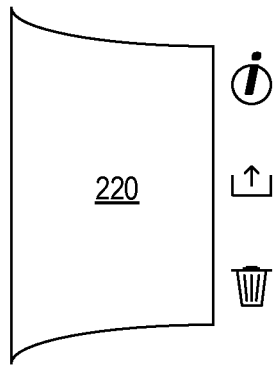
Figure 2F:
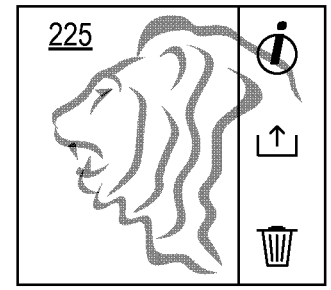

FIGS. 2A-2F illustrate compressed views of graphical control elements in accordance with various embodiments. In FIG. 2A, a compressed view 200 graphically rotates the visual area of element 114 along the same axis as in the example of FIG. 1C but in the opposite direction. In FIG. 2B, a compressed view 205 presents itself as having three folds, the center of which appears to rise up out of the page. In FIG. 2C, a compressed view 210 presents itself as a rectangular sheet bulging upward away from the screen. In FIG. 2D, the left edge of a compressed view 215 appears to fall downward, away from the viewer, as the graphical control element slides to the left. In FIG. 2E, the left edge of a compressed view 220 appears to rise upward, toward the viewer, as the graphical control element slides to the left. In the example of FIG. 2F, user input, such as a swipe or double tap, renders a visual area 225 partially transparent so that both notecard content and the underlying settings icons are visible. Other possibilities will be apparent to those of skill in the art.

FIGS. 3A-3E illustrate an exemplary user interface 300 that appears on a surface of the touch-screen display device noted previously in connection with FIGS. 1A-1D but held in a portrait mode. These figures have elements in common with earlier figures, with like-identified elements being the same or similar. Graphic control elements introduced earlier in the landscape mode are labeled with a "P," for portrait, but are functionally similar and link to the same underlying program or programs. The visual areas of the control elements are rectangles in this example, but other shapes may be used.

The user can enter the portrait mode using icon 107 or, if the display device includes the requisite orientation-sensing hardware, by simply placing the display device in the portrait orientation. The graphical control elements are ordered as in the prior example of FIGS. 1A-1D, but their visual areas are of different aspect ratio. Aspects of the control elements and their order of presentation can be controlled via setting icon 102.

Figure 3A:
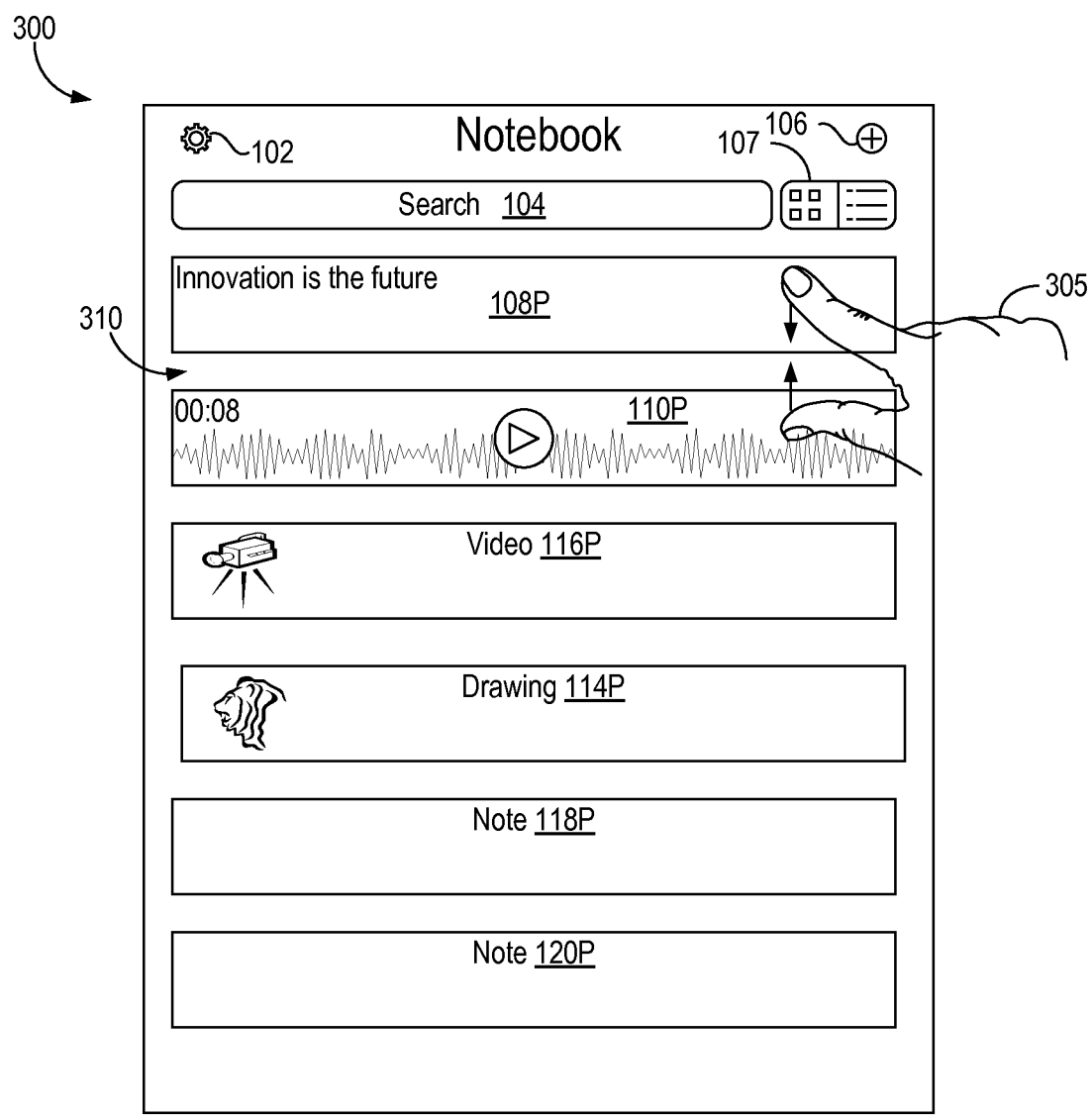
FIGS. 3A-3E illustrate an exemplary user interface 300 that appears on a surface of the touch-screen display device noted previously in connection with FIGS. 1A-1D but held in a portrait mode.
Figure 3B:
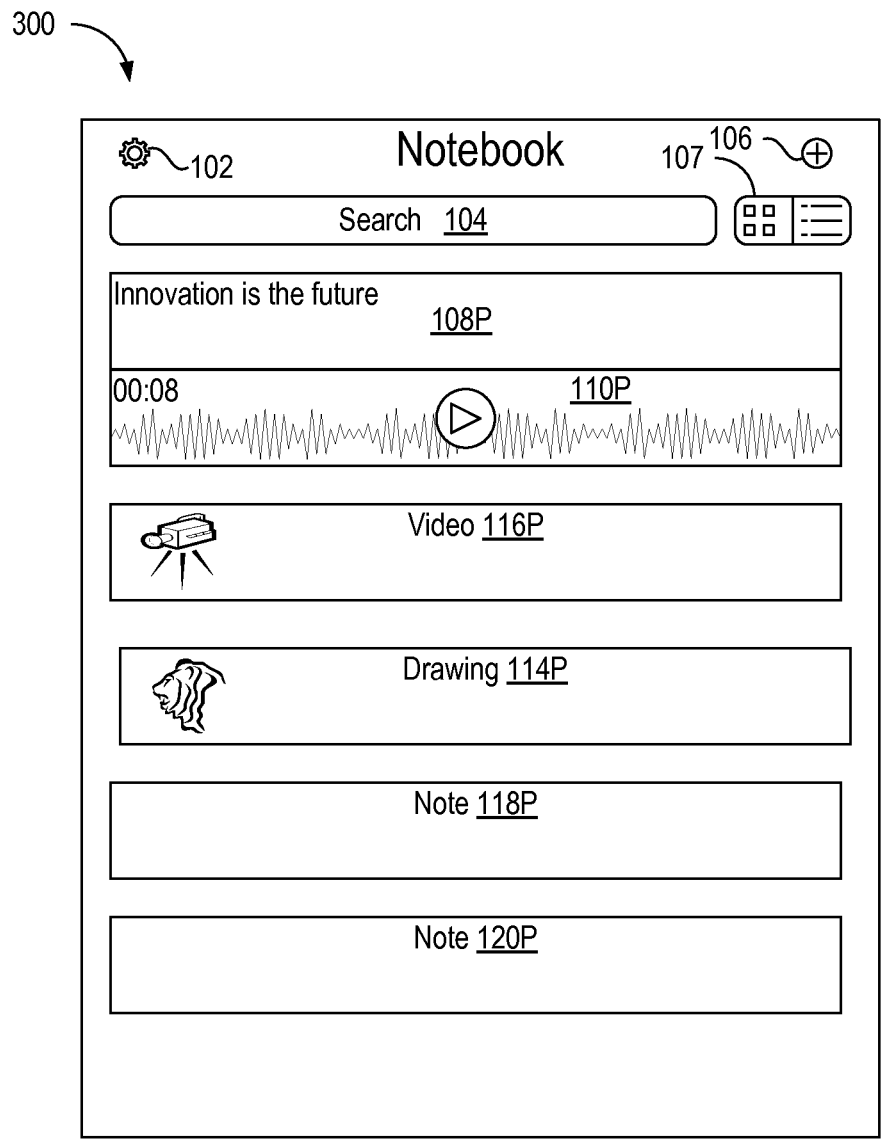

FIG. 3A depicts a user's hand 305 with the index finger and thumb contacting interface 300 at respective first and second contact points within the visual areas of first graphical control element 108P and second graphical control element 110P. Using a "pinch" movement, the user closes the gap between the finger and thumb (or any two fingers) so that interface 300 detects a convergence of the first and second contact points. Responsive to this convergence, the display device closes a space 310 separating the first and second graphical control elements. The user is thus able to graphically depict the connection between logically connected notecards, such as text and an audio file from a meeting. Interface 300 with adjacent touching graphical control elements 108P and 110P is depicted in FIG. 3B. In one embodiment, returning the display device to the landscape mode illustrates the combination of control elements 108P and 110P as control element 126 of FIG. 1B.

The display device avoids unintended separations of consolidated graphical control elements using a simulated attraction between control elements that are visibly combined. The display device calculates the simulated attraction between visual areas of corresponding control elements and graphically renders an opening of the gap or space only if the opening motion (the opposite of pinching) satisfies some predetermined criteria. For spaced control elements, a simulated repulsive force can be used to prevent undesired consolidation. Audible feedback, such as a "click," can be associated with e.g. closing a space if the display device is equipped with a speaker. The simulated attraction is thus either attractive or repulsive depending upon the degree of separation between control elements. Hysteresis can be employed such that the displacement required of one or both adjacent control elements to change states depends upon whether the elements are separate or together, and the degree of attraction or repulsion can be more or less dependent upon the degree of separation.

Figure 3C:
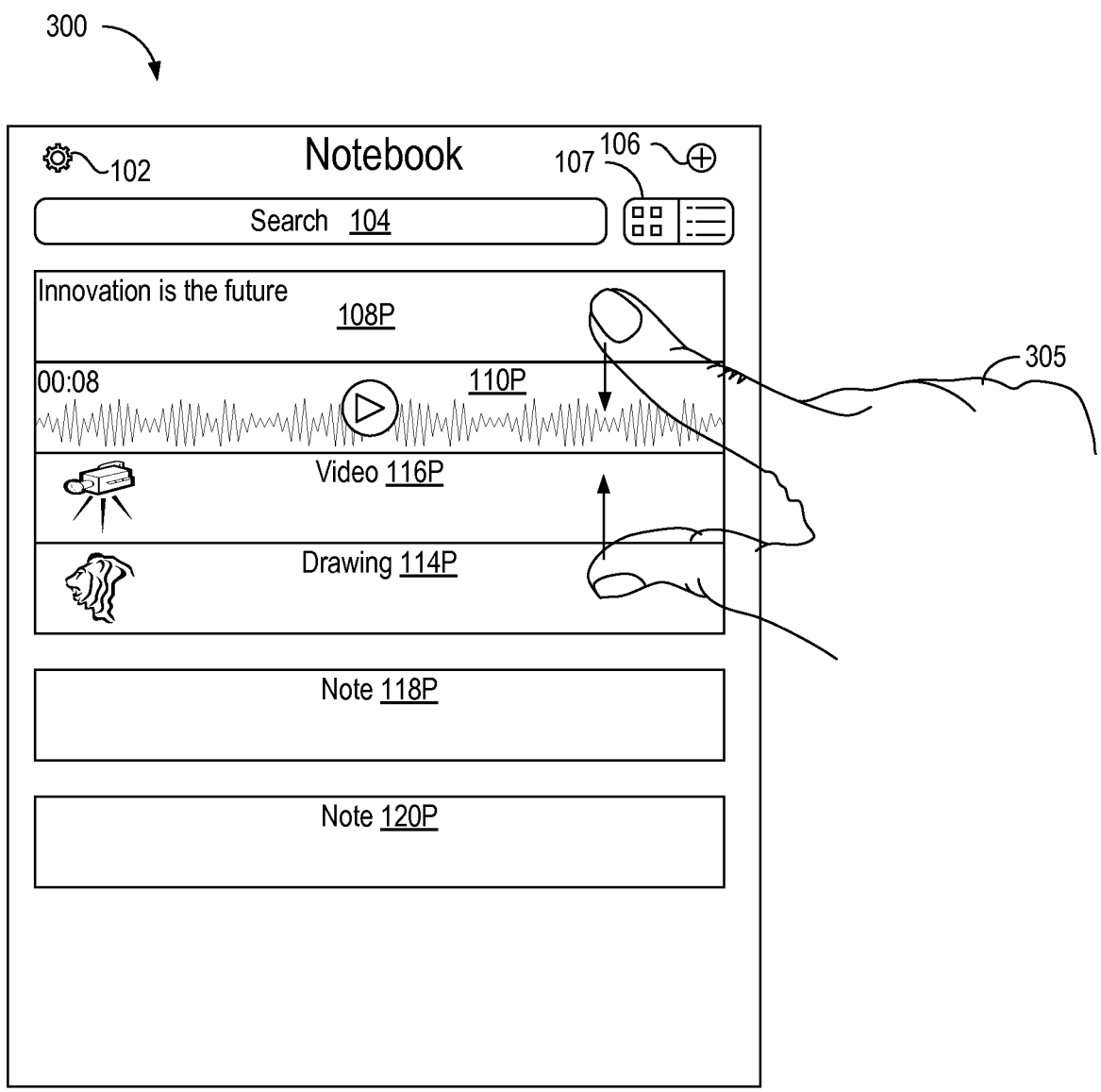
Figure 3D:
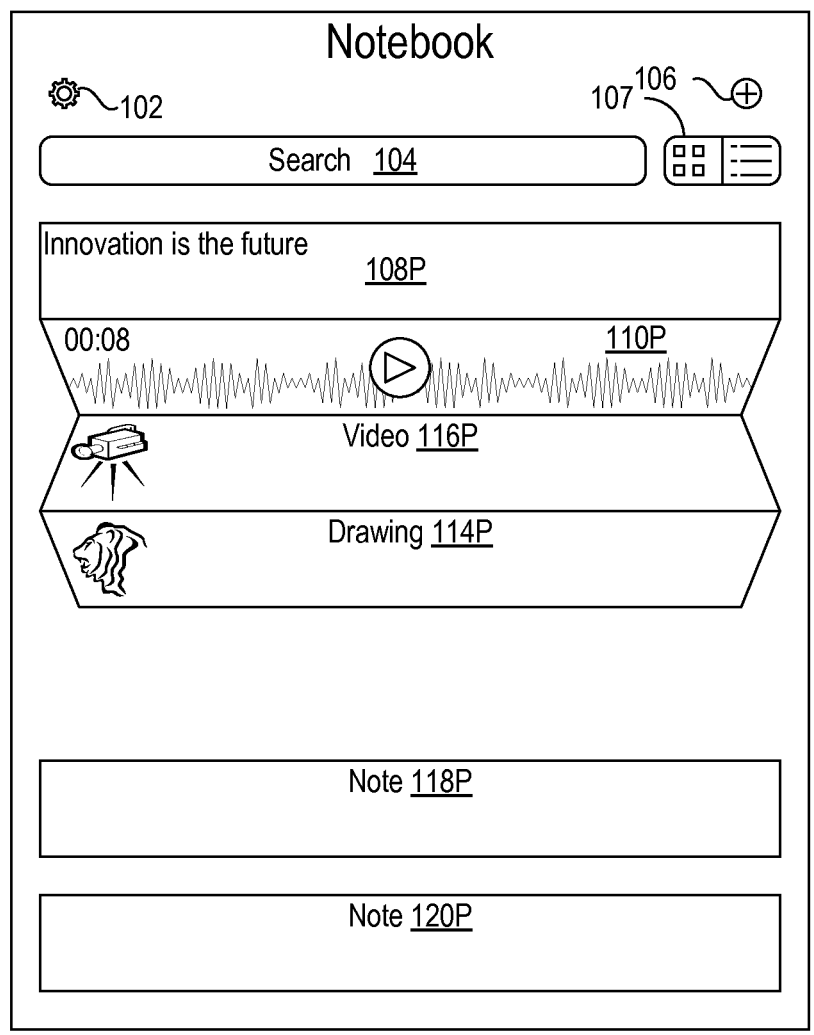
Figure 3E:
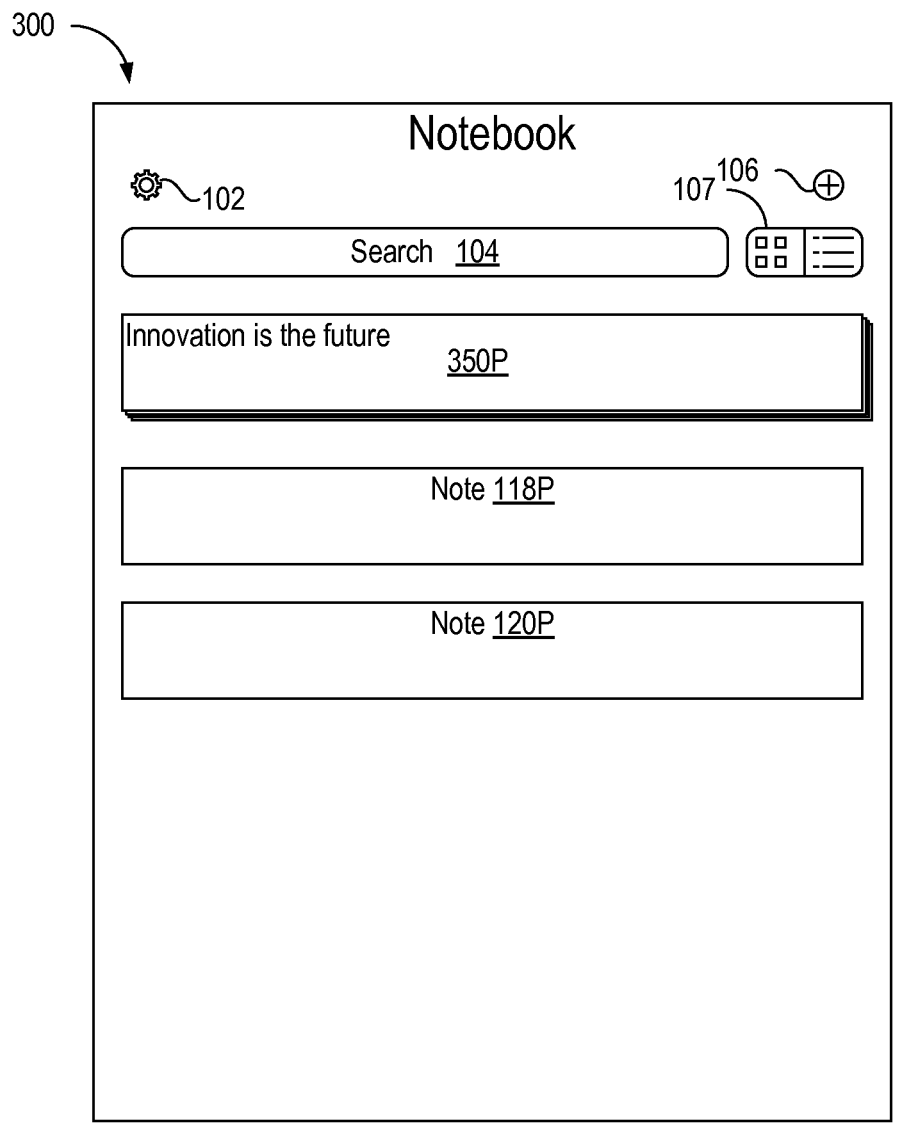

FIG. 3C illustrates another control feature of interface 300 that allows the user to collapse related graphical control elements into a single control element. In this example, four control elements 108P, 110P, 116P, and 114P are collected into a group (e.g., they are not spaced, or the spaces between them are relatively small). The index finger and thumb of hand 305 establish respective contact points within the visual areas of two of the control elements in the group, the outermost two in this illustration. Using the pinch movement noted previously, the user closes the gap between the finger and thumb so that interface 300 detects a convergence of the first and second contact points. Responsive to this convergence, the display device folds the collective area of the affected control elements along the boundaries between the control elements. This folding is animated, with about half way illustrated in FIG. 3D. The consolidated notecard stack 350—rather a graphic control element depicted as a stack of notecards—is illustrated in FIG. 3E. The remaining notecard 118P and 120P approach stack 350P to take advantage of the newly created visual space.

Figure 4:
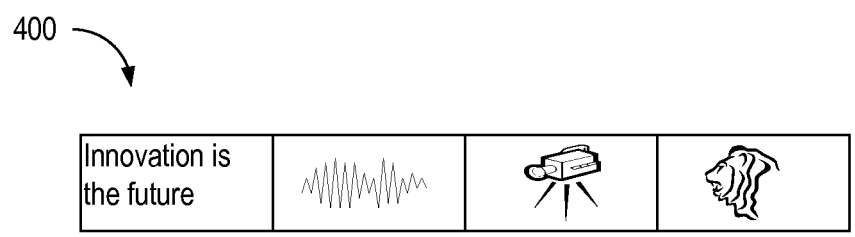
FIG. 4 depicts a graphical control element 400 that visually represents the same consolidated notecards as stack 350P of FIG. 3E.

FIG. 4 depicts a graphical control element 400 that visually represents the same consolidated notecards as stack 350P of FIG. 3E. Element 400 includes an iconic summary of the contents of at least some of the constituent notecards, or generic icons representative of the associated media (e.g., a camera may be representative of a photo or photo collection, or a photo from the collection may be used).

Figure 5:
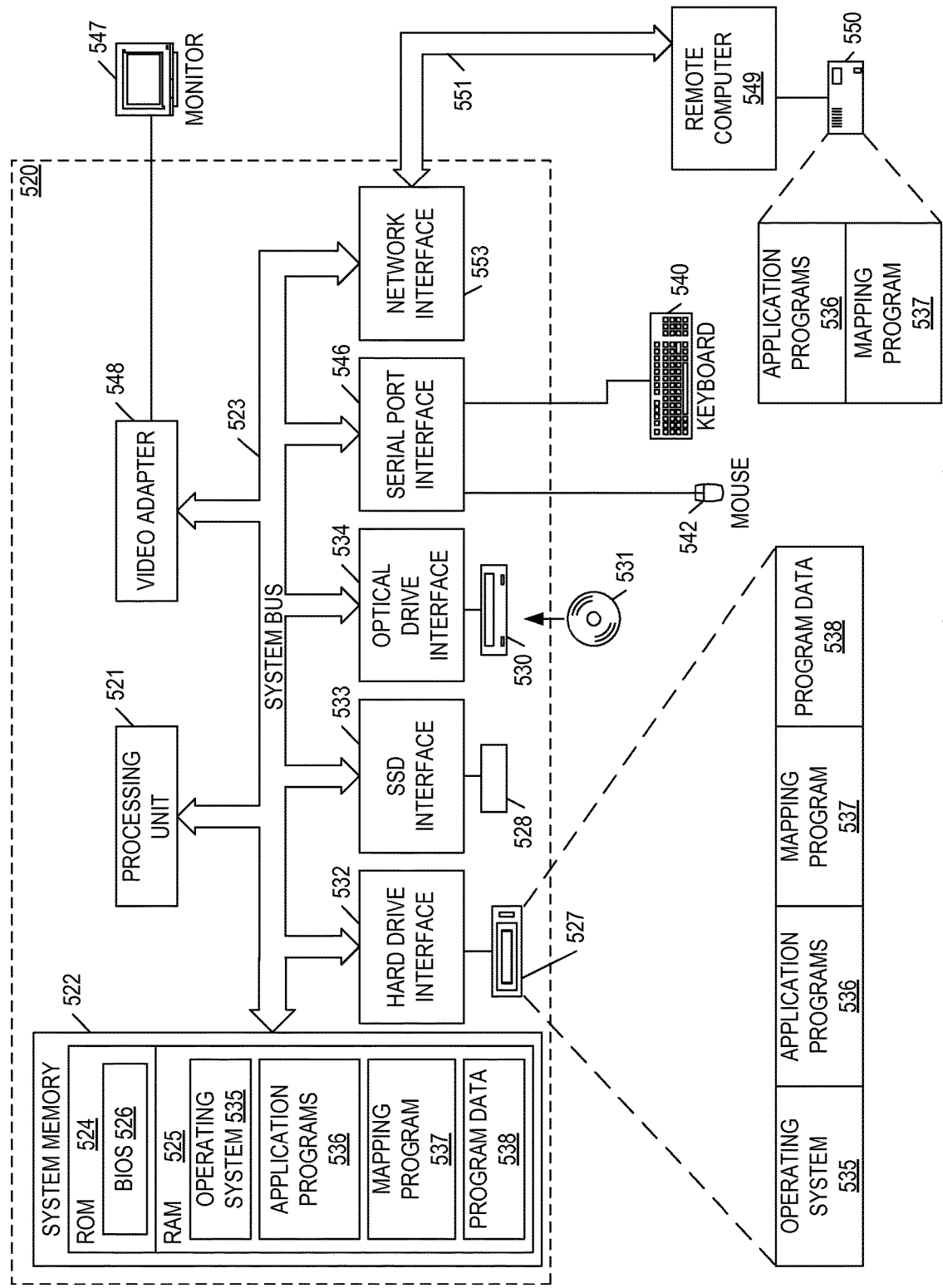
FIG. 5 depicts a general-purpose computing system 500 that can serve as a client or a server depending on the program modules and components included.

FIG. 5 and the following discussion are intended to provide a brief, general description of a suitable computing environment in which the invention may be implemented. The user interfaces and computer operations effectuating them may be provided as a software service using software or program modules executing on one or more servers and one or more client computing devices, e.g., a mobile digital device such as an iPad® manufactured by Apple, Inc. of Cupertino, Calif. In another embodiment, the user interfaces and computer operations effectuating them are provided by a client application executing on a client computing device. The foregoing examples are described in the general context of computer-executable instructions, such as program modules, executed on client and server computers linked through a communication network, including the Internet. Generally, program modules include routines, programs, objects, components, data structures, etc., that perform operations, particular tasks, or implement particular abstract data types. In a distributed computing environment, program modules may be located in both local and remote memory storage devices, and may be executed by client and server computers.

FIG. 5 depicts a general-purpose computing system 500 that can serve as a client or a server depending on the program modules and components included. One or more computers of the type depicted in computing system 500 can be configured to perform operations described with respect to FIGS. 1-4. Those skilled in the art will appreciate that the invention may be practiced using other system configurations, including hand-held devices, multiprocessor systems, microprocessor-based or programmable consumer electronics, network PCs, minicomputers, mainframe computers, and the like.

Computing system 500 includes a conventional computer 520, including a processing unit 521, a system memory 522, and a system bus 523 that couples various system components including the system memory to the processing unit 521. The system bus 523 may be any of several types of bus structures, including a memory bus or memory controller, a peripheral bus, and a local bus using any of a variety of bus architectures. The system memory includes read only memory (ROM) 524 and random access memory (RAM) 525. A basic input/output system 526 (BIOS), containing the basic routines that help to transfer information between elements within the computer 520, such as during start-up, is stored in ROM 524. The computer 520 further includes a hard disk drive 527 for reading from and writing to a hard disk, not shown, a solid-state drive 528 (e.g. NAND flash memory), and an optical disk drive 530 for reading from or writing to an optical disk 531 (e.g., a CD or DVD). The hard disk drive 527 and optical disk drive 530 are connected to the system bus 523 by a hard disk drive interface 532 and an optical drive interface 534, respectively. The drives and their associated computer-readable media provide nonvolatile storage of computer readable instructions, data structures, program modules and other data for computer 520. Other types of computer-readable media can be used.

A number of program modules may be stored on the hard disk, solid state disk 528, optical disk 531, ROM 524 or RAM 525, including an operating system 535, one or more application programs 536, other program modules 537, and program data 538. A user may enter commands and information into the computer 520 through input devices such as a keyboard 540 and pointing device 542. Other input devices (not shown) may include a microphone, joystick, game pad, satellite dish, scanner, or the like. These and other input devices are often connected to the processing unit 521 through a serial port interface 546 that is coupled to the system bus, but may be connected by other interfaces, such as a parallel port, game port or a universal serial bus (USB). A monitor 547 or other type of display device is also connected to the system bus 523 via an interface, such as a video adapter 548. In addition to the monitor, computers can include or be connected to other peripheral devices (not shown), such as speakers and printers.

The computer 520 may operate in a networked environment using logical connections to one or more remote computers, such as a remote computer 549. The remote computer 549 may be another computer, a server, a router, a network PC, a peer device or other common network node, and typically includes many or all of the elements described above relative to the computer 520, although only a memory storage device 550 has been illustrated in FIG. 5. The logical connections depicted in FIG. 5 include a network connection 551, which can support a local area network (LAN) and/or a wide area network (WAN). Such networking environments are commonplace in offices, enterprise-wide computer networks, intranets and the Internet.

Computer 520 includes a network interface 553 to communicate with remote computer 549 via network connection 551. In a networked environment, program modules depicted relative to the computer 520, or portions thereof, may be stored in the remote memory storage device. It will be appreciated that the network connections shown are exemplary and other means of establishing a communications link between the computers may be used.

In the foregoing description and in the accompanying drawings, specific terminology and drawing symbols are set forth to provide a thorough understanding of the present invention. In some instances, the terminology and symbols may imply specific details that are not required to practice the invention. For example, the touch-screen display devices discussed above are "smart phones" that support many services in addition to standard voice functions. Portable computing devices other than smart phones such as tablet computers, e.g., a mobile digital device such as an iPad® manufactured by Apple, Inc. of Cupertino, Calif., and palm-top and lap-top computers, can be equipped as detailed herein to serve as touch-screen display devices. Moreover, some components or devices are shown directly connected to one another while others are shown connected via intermediate components, or wirelessly, e.g., Wi-Fi, Bluetooth, a public WAN, e.g., the Internet, or a cellular network. In each instance, the method of interconnection establishes some desired electrical or logical communication between two or more devices, as will be understood by those of skill in the art. More generally, the term "network" may refer to one or more networks of networks, in other words, one or more interconnected networks of various types such that a node, e.g., a client or server device, communicates via the network with another node. A network may include several types of networks, for example, private or public networks, local (LAN) and wide area (WAN) networks, wired, wireless, and cellular networks, and the Internet.

Variations of these embodiments, including embodiments in which features are used separately or in any combination, will be obvious to those of ordinary skill in the art. Therefore, the spirit and scope of the appended claims should not be limited to the foregoing description. In U.S. applications, only those claims specifically reciting "means for" or "step for" should be construed in the manner required under 35 U.S.C. § 112(f).

What is claimed is:

1. A computer-implemented method comprising:
    presenting a first graphical control element on a surface of a touch-screen display device, the first graphical control element including a first visual area depicting an iconic representation of a first media file and including a link to an associated first executable program;
    presenting a second graphical control element on the surface of the display device and separated from the first graphical control element by a space, the second graphical control element including a second visual area depicting an iconic representation of a second media file and including a link to an associated second executable program, and wherein the second graphical control element has a logical connection to the first graphical control element in that media content of the second media file pertains to subject matter and media content of the first media file pertains to the same subject matter
    detecting a first user input at a first contact point in the first visual area, a second user input at a second contact point in the second visual area, and a convergence of the first contact point and the second contact point; and
    responsive to the convergence, closing the space between the first graphical control element and the second graphical control element to graphically depict the logical connection between the first graphical control element and the second graphical control element by displaying them as separate but adjacent touching graphical control elements;
    calculating a simulated attraction between the first visual area and the second visual area wherein the degree of simulated attraction varies in proportion to a degree of separation between the first visual area and the second visual area; and
    graphically rendering the closing using the calculated, simulated attraction.

2. The computer-implemented method of claim 1, wherein the first media file is a different media type or format than the second media file.

3. The computer-implemented method of claim 1, further comprising presenting a third graphical control element on the surface of the display device responsive to the convergence, the third graphical control element including a third visual area depicting the first graphical control element and the second graphical control element.

4. The computer-implemented method of claim 3, wherein the third visual area is less than a sum of the first visual area and the second visual area.

5. The computer-implemented method of claim 4, wherein the third visual area is greater than the first visual area and the second visual area.

6. The computer-implemented method of claim 3, further comprising:
    detecting a third user input at a third contact point on the first graphical control element of the third visual area, a fourth user input at a fourth contact point on the second graphical control element of the third visual area, and a second convergence of the third contact point and the fourth contact point; and
    responsive to the second convergence, graphically folding the third visual area along a boundary between the first graphical control element and the second graphical control element.

7. The computer-implemented method of claim 1, further comprising:
    presenting a third graphical control element on the surface of the display device and separated from the second graphical control element by a second space, the third graphical control element including a third visual area depicting the third graphical control element;
    detecting a third user input at a third contact point, a fourth user input at a fourth contact point in the third visual area, and a second convergence of the third contact point and the fourth contact point; and
    responsive to the second convergence, closing the second space between the second graphical control element and the third graphical control element.

8. The computer-implemented method of claim 7, further comprising:
    detecting a fifth user input at a fifth contact point and a sixth user input at a sixth contact point, and a third convergence of the fifth contact point and the sixth contact point; and
    responsive to the third convergence, graphically folding the second graphical control element relative to the first graphical control element and the third graphical control element relative to the second graphical control element.

9. The computer-implemented method of claim 8, wherein graphically folding the second graphical control element relative to the first graphical control element depicts a first direction of folding, and folding the third graphical control element relative to the second graphical control element depicts a second direction of folding.

10. The computer-implemented method of claim 1, further comprising issuing audible feedback as the first visual area contacts the second visual area.

11. The computer-implemented method of claim 1, wherein the first visual area graphically represents a card with an aspect ratio, the method further comprising sensing a change in orientation of the display device and changing the aspect ratio responsive to the sensed change.

12. The computer-implemented method of claim 1, wherein the first graphical control element appears as a first notebook and the second graphical control element appears as a second notebook.

13. A system comprising:
one or more computers configured to perform operations including:
presenting a first graphical control element on a surface of a display device, the first graphical control element including a first visual area depicting an iconic representation of a first media file and including a link to an associated first executable program;
presenting a second graphical control element on the surface of the display device and separated from the first graphical control element by a space, the second graphical control element including a second visual area depicting an iconic representation of a second media file and including a link to an associated second executable program, and wherein the second graphical control element and the first graphical control element are logically connected in that media content of the second media file pertains to subject matter and media content of the first media file pertains to the same subject matter
detecting a first user input at a first contact point in the first visual area, a second user input at a second contact point in the second visual area, and a convergence of the first contact point and the second contact point; and
responsive to the convergence, closing the space between the first graphical control element and the second graphical control element to graphically depict the logical connection between the first graphical control element and the second graphical control element by displaying them as separate but adjacent touching graphical control elements;
calculating a simulated attraction between the first visual area and the second visual area wherein the degree of simulated attraction varies in proportion to a degree of separation between the first visual area and the second visual area; and
graphically rendering the closing using the calculated, simulated attraction.

* * * * *